United States Patent [19]
Schrum et al.

[11] Patent Number: 5,203,645
[45] Date of Patent: Apr. 20, 1993

[54] UNDERWATER MANIPULATOR

[75] Inventors: Phillip B. Schrum, Clairton; George H. Cohen, Pittsburgh, both of Pa.

[73] Assignee: The United States of America as represented by the United States Department of Energy, Washington, D.C.

[21] Appl. No.: 819,244

[22] Filed: Jan. 10, 1992

[51] Int. Cl.⁵ .................................. B63C 11/52
[52] U.S. Cl. .................................. 405/191; 166/338; 405/188
[58] Field of Search ............. 405/185, 188, 190, 191; 166/338, 341; 901/2, 19, 24

[56] References Cited

U.S. PATENT DOCUMENTS

| | | | |
|---|---|---|---|
| 3,463,226 | 8/1969 | Johnson | 405/191 X |
| 4,643,616 | 2/1987 | Castel et al. | 405/191 |
| 4,974,996 | 12/1990 | Vielmo et al. | 405/188 |
| 5,039,254 | 8/1991 | Piercy | 405/191 |

*Primary Examiner*—David H. Corbin
*Attorney, Agent, or Firm*—Virginia B. Caress; William R. Moser; Richard E. Constant

[57] ABSTRACT

Self-contained, waterproof, water-submersible, remote-controlled apparatus is provided for manipulating a device, such as an ultrasonic transducer for measuring crack propagation on an underwater specimen undergoing shock testing. The subject manipulator includes metal bellows for transmittal of angular motions without the use of rotating shaft seals or O-rings. Inside the manipulator, a first stepper motor controls angular movement. In the preferred embodiment, the bellows permit the first stepper motor to move an ultrasonic transducer ±45 degrees in a first plane and a second bellows permit a second stepper motor to move the transducer ±10 degrees in a second plane orthogonal to the first. In addition, an XY motor-driven table provides XY motion.

9 Claims, 2 Drawing Sheets

UNDERWATER MANIPULATOR

GOVERNMENT CONTRACT RIGHTS

The invention described herein was made or conceived in the course of or under Contract No. DE-AC11-76PN00014 awarded by the U.S. Department of Energy to Westinghouse Electric Corporation, according to which the United States Government has rights in this invention and title thereto is in the Department of Energy.

TECHNICAL FIELD OF THE INVENTION

The present invention relates to remotely controllable manipulator apparatus which provides for ample movement of a device such as a transducer or measuring probe in order to gain proximity to a specimen. More particularly, the manipulator of the invention is a submersible, remotely operable device which can position an ultrasonic transducer, e.g., for measuring crack propagation on an irradiated specimen in an underwater environment.

DESCRIPTION OF THE PRIOR ART

Many types of apparatus have been described for the manipulation of various devices utilized in underwater exploration, construction, drilling, etc. For example, H. A. Ballinger, U.S. Pat. No. 3,350,386 describes a remotely controlled underwater vehicle with four retractable limbs, each of which is mounted on a rotatable sponson; Yasuo Itami, U.S. Pat. No. 3,629,963 teaches an underwater bulldozer controlled from the surface by electrical signals conducted through a cable; David Grossman, U.S. Pat. No. 3,881,605 shows an object orienting device to assist a robot manipulator; and Rene Szabo et al., U.S. Pat. No. 4,579,480 discloses a remotely controlled handling device for submerged structures used to connect underwater pipes.

As part of a materials development and testing program to study the effects of high intensity irradiation on materials used in the core of a nuclear reactor, specimens are notched to create an intentional defect. The notched specimens are irradiated and shocked on an underwater shock machine where crack propagation from the intentional defect is measured after shock testing. For obvious reasons, none of the aforementioned prior art remote handling devices is well suited for use in precisely manipulating transducers in such an underwater environment.

Commercially available manipulators which have been successfully used to manipulate transducers underwater, e.g., the Model 2250 manipulator manufactured by Custom Machine Co. to facilitate longitudinal and shear wave inspection of circular, contoured aircraft engine parts, function by remotely moving an underwater ultrasonic transducer with bevel gears powered through long shafts in a support structure and powered by a motor located above the water surface. Since measurements may need to be made ten feet or more underwater, adapting such a manipulator to operate from above has proven impractical because such a long cantilever support can easily vibrate and deflect, thereby greatly reducing the positional accuracy of the transducer beyond satisfactory limits.

Another reason for not using such a commercial unit in this type of environment is the possibility of increased radiation exposure of the operator to contaminants stirred up by the motion of the support structure at the water's surface.

In overcoming the above-mentioned deficiencies of commercially available prior art devices, a manipulator must be completely submersible and remotely operable unit and must provide the needed degrees of freedom without the need for long shafts or gears.

SUMMARY OF THE INVENTION

The present invention provides a self-contained, waterproof, water-submersible, remote-controlled apparatus for carrying and precisely positioning a manipulated device, for example, an ultrasonic transducer measuring crack propagation on an underwater specimen undergoing shock testing. The manipulator apparatus has a movable member, preferably a metal bellows welded to the housing, for transmittal of angular motion without the use of rotating shaft seals or O-rings.

Inside the manipulator, a first stepper motor pivotally connected and orthogonal to the transducer angularly moves the transducer in a plane orthogonal to the motor's shaft by using the rotation of the shaft to move a connecting arm up or down.

A second stepper motor that actuates the transducer in a direction orthogonal to that of the first stepper motor adds a second degree of freedom to the manipulation of the transducer. A shaft of the motor parallel or coaxial to the axis of the transducer and attached to the housing of the manipulator rotates the transducer. When the transducer has been tilted by the first stepper motor and is rotated with the second, its tip follows an arc, the radius of which depends on the degree of tilt.

A manipulator of this invention, with either one or two stepper motors, can be connected by a shaft to an XY motor driven table. Preferably, the connection is releasable and rotatable.

Additional stability can be achieved by adding counterbalancing weights to the housing.

DETAILED DESCRIPTION

It was previously explained that, as part of a materials development and testing program, specimens are notched to create an intentional defect, after which they are irradiated and shocked on an underwater shock machine. The preferred embodiment of the present invention has been developed to measure crack propagation resulting from the intentional defect following shock testing and this application will now be more particularly described as the presently preferred embodiment.

Figure 1:
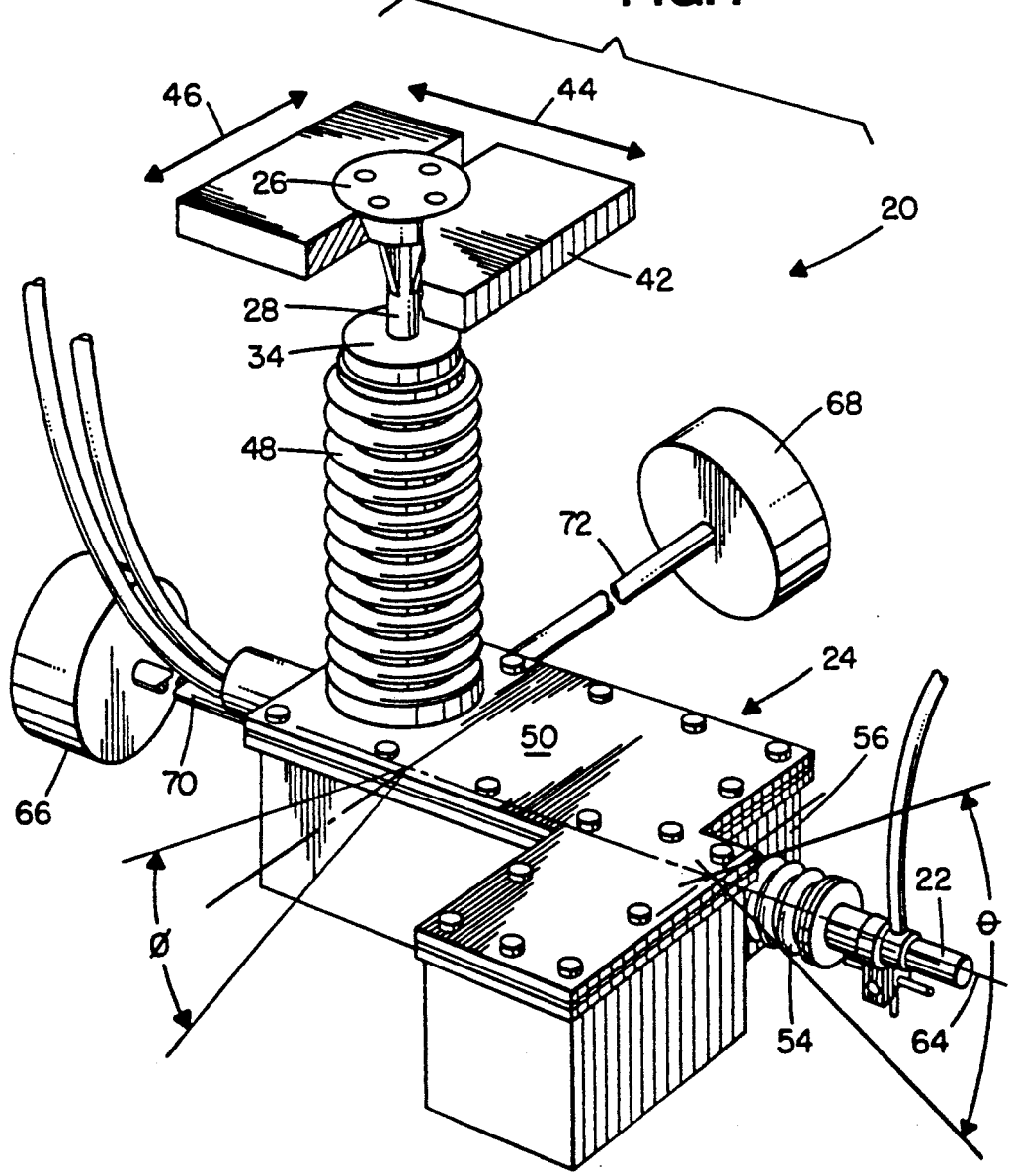
FIG. 1 is a perspective view of an ultrasonic transducer manipulator embodying the present invention, certain parts being cut away for clarity.

Turning now to the drawings, FIG. 1 illustrates an ultrasonic transducer manipulator 20 which embodies the invention. It is a submersible, remotely operable, device which can position an ultrasonic transducer 22 for measuring crack propagation on an irradiated specimen (not shown) in an underwater or similar environment. Other probes or devices can be substituted for the transducer.

The manipulator 20 includes a completely sealed stainless steel housing 24 (main housing) which is suspended from a disk 26 on top of a support strut 28 which extends into main housing 24. A bellows 48 extends between the table 42 and a cover 50 of the main housing 24, forming a flexible protrusion. Support disk 26 at the uppermost end of the support strut 28 is clamped in a suitable manner to an XY motor driven table 42. Table 42 is movable along an X axis as indicated by a double headed arrow 44 and along a Y axis as indicated by a double headed arrow 46. The motion imparted to the main housing 24 by the table 42 is necessary to position the transducer 22 near the specimen. On occasion, it may be desirable to unclamp the disk 26 from the table 42 and rotate it, generally about a longitudinal axis of the support strut 28, then reclamp it, thereby more accurately aligning the transducer 22 with the specimen.

As the XY motor-driven table 42 is not an integral part of the manipulator, bellows 48 cannot be attached directly thereto. Preferably, two disks are provided at the upper end of support strut 28; an upper disk 26 slides into a receptacle slot formed in the bottom of table 42 to support the manipulator below the table, permitting the rotation described above. The lower sealing disk 34 is an integral part of strut 28 and is positioned slightly below table 42 when the manipulator is installed in the receptacle slot. The bellows 48 is welded or otherwise affixed around its circumferences to seal the manipulator to the main housing and to the support strut 28 to prevent entry of any water into the interior of the main housing. The connection between the support strut and the end of the bellows distant from the main housing is made possible by disk 34, through which the support strut protrudes. Sealing by welding is preferred.

In order to stabilize the manipulator 20 as it is operated, a pair of weights 66, 68 are provided, attached to the ends of arms 70, 72, respectively. The arms are attached to main housing 24 and the weights are suitably positioned along the arms to counterbalance the various components of the manipulator and assure that main housing 24 is maintained level in its operating environment. In this manner, total control can be achieved over transducer 22 solely by means of motors 30 and 60 and by motor driven table 42.

Figure 2:
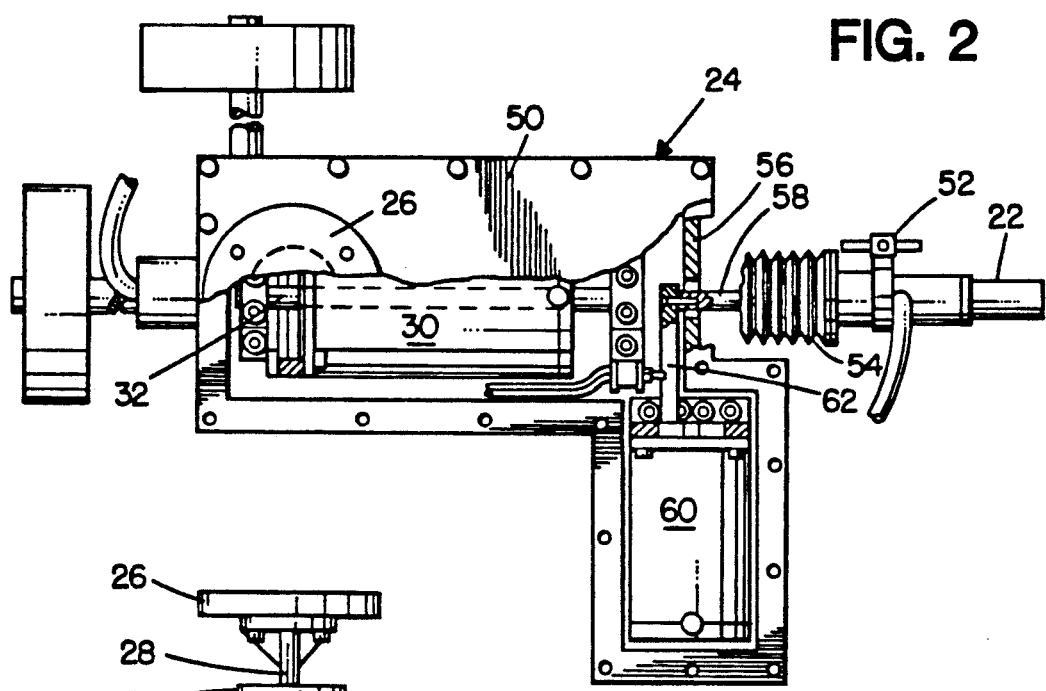
FIG. 2 is a top plan view of the manipulator illustrated in FIG. 1, certain parts being cut away and shown in section.
Figure 3:
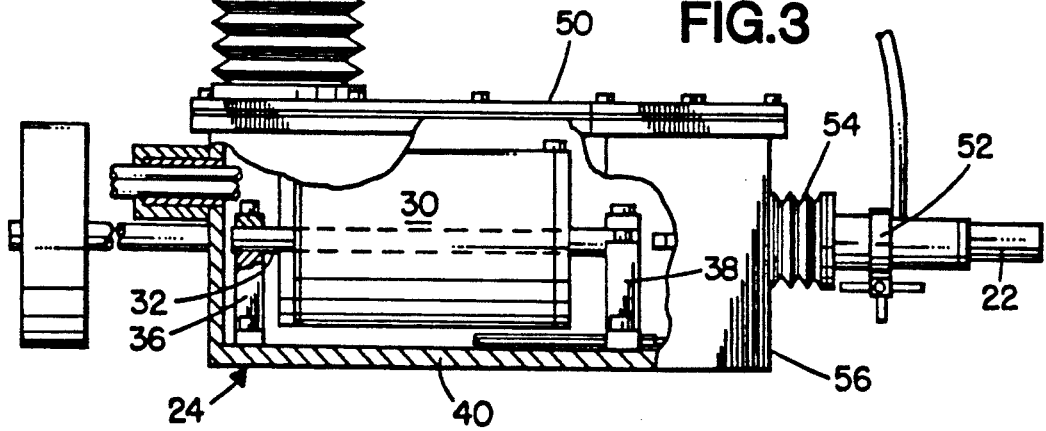
FIG. 3 is a side elevation view of the manipulator, certain parts being cut away and shown in section.
Figure 4:
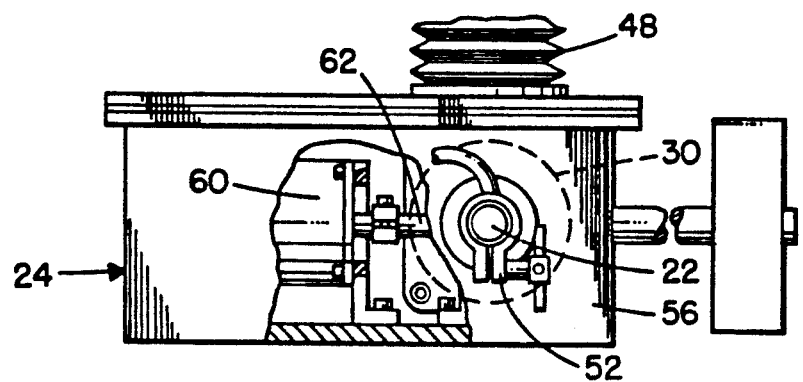
FIG. 4 is a front elevation view of the manipulator of the invention, certain parts being cut away and shown in section.

As best shown in FIGS. 2 and 3, manipulator 20 includes a completely sealed stainless steel main housing 24 which is suspended from disk 26 on top of support strut 28 which extends into the housing and is suitably attached to the casing of a stepper motor 30 so as to be integral therewith. A continuous motor shaft 32 is fixedly attached to upstanding brackets 36, 38, respectively, which are in turn attached to the floor 40 of the housing 24 that actuation of the motor 30 rotates the shaft 32 and the housing. Rotation occurs about a longitudinal axis aligned with the axis of shaft 32 within an arc of approximately ±10 degrees as indicated by the angle phi in FIG. 1. In a typical mode of operation, motor 30 has a resolution of 0.014 degrees per step.

With continued attention to FIGS. 1–4, transducer 22 fits in a clamp 52 at the end of a second stainless steel bellows 54 which, as with the bellows 48, extends from a wall 56 of main housing 24 and the clamp and is sealingly attached thereto, as by welding. Inside bellows 54 and connected to clamp 52 is a shaft 58 (see FIG. 2) which is actuated by a second, smaller stepper motor 60. Through a suitable mechanical arrangement, stepper motor 60 is connected to the shaft 58 by a connecting arm 62. With operation of stepper motor 60, connecting arm 62 is moved through an arc which is effective to raise and lower the end of the shaft 58 nearest the wall 56. In cooperation with the bellows 54, the transducer 22 is thereby moved through a much larger arc indicated as in FIG. 1. The arc is approximately ±45 degrees from a horizontal centerline 64 and lies in a vertical plane perpendicular to the horizontal center plane. In a typical construction, the resolution obtained by the transducer 22 is approximately 0.014 degrees per step.

Because stepper motors can induce noise signals into the ultrasonic circuit, known precautions (such as proper shielding techniques) are generally advisable to minimize noise pickup which would interfere with interpretation of the ultrasonic signals from the transducer.

There are numerous benefits which accrue from the invention. In a first instance, a long drive shaft and support structure are not required with the manipulator of the invention since it is a self contained waterproofed unit. This feature assures accuracy in its positioning because there is no long cantilever support which can vibrate or deflect. Further, direct drive of the theta and phi motions avoids the inaccuracies associated with the backlash of gear-driven units. Also, the manipulator of the invention operates completely underwater, and thus reduces the exposure of personnel to radiation in a radioactive environment. As another significant benefit, the waterproofing employed does not incorporate 0-rings or moving shaft seals which might fail or leak; conventional cable preparation and potting techniques known to those of ordinary skill in the art are generally sufficient to ensure watertight seals. Conventional semi-automatic computer-controlled operation aids the operators, minimizes positioning errors, and allows a 0.0144 degree positioning resolution.

The manipulator of this invention provides heretofore unachieved angular positioning accuracy and repeatability for underwater transducer manipulation. The manipulator of the invention is versatile enough to position other types of transducers that operate in a fluid medium, such as UT or eddy current devices which are used to initially detect defects, as well as in presently preferred uses such as described herein which measure known defects. Other kinds of devices can be substituted for the transducer. Possible devices include measuring probes, e.g., for electrochemical properties, mechanical properties, or local conditions, as well as devices that bring about conditions, e.g., by means of heat, light, or pressure.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A remotely operable, sealed manipulator apparatus whereby an attached instrument is positioned in a hostile environment, including submerged, and angularly oriented about two rotation axes which are not parallel, such that said instrument is accurately positioned and accurately angularly oriented in said hostile environment proximate to but not mechanically attached to a target object, said manipulator comprising:

a platform attached to a means of positioning said platform;

a means for positioning said platform to a position in close proximity to an object in a hostile environment, such as submerged;

a rigid strut attached to said platform at one end and attached to the second movable member of a sealed housing at the other end;

a sealed housing having two movable members projecting from said housing, both movable without breaking the seal, with the second movable member being rigidly attached to said rigid strut attached to said platform;

said first movable member projecting from said housing, said member being angularly movable with respect to said housing in a first plane and about an axis of rotation transverse to the housing, said first movable member being angularly movable without breaking the seal of said housing;

a means of rigidly attaching to said first movable member at the end of said first movable member external to the housing a device for measuring or directing emanations at a target object;

a first driver means attached to said first movable member within said housing for causing said member and said means of rigidly attaching an external device to the external end thereof to move angularly within a first plane;

said second movable member projecting from said sealed housing and rigidly attached to the rigid strut attached to said platform, said second movable member being angularly movable with respect to a frame of reference embedded in said sealed housing in a second plane of rotation with respect to said housing which second plane or rotation is not parallel to the plane of rotation of the first movable member, said second movable member being movable without breaking the seal of said housing and in such a manner that when the second movable member rotates with respect to said sealed housing the said sealed housing rotates with respect to the frame of reference of said platform; and a second driver within said sealed housing attached to the proximate end of the second movable member in such a manner that the second driver rotates the said sealed housing with respect to said attached rigid strut, such that the housing rotates the first movable member and said means of rigidly attaching an external device to the first movable member, said rotation being about an axis of said sealed housing not parallel to the axis of rotation of the first movable member, such that when the sealed housing and the means of rigidly attaching an external device have been moved angularly by the second driver, the said external device traces an arc, thereby allowing the said external device to be moved in a second plane not parallel to its first plane of rotation.

2. The apparatus of claim 1 wherein:

the first movable member has an internal end within the said sealed housing and an external end outside said sealed housing and the first driver is a stepper motor with an off-axis connector arm pivotally attached to the internal end of said first movable member such that actuation of the stepper motor causes the end of said first movable member attached to the said external device to move angularly in said first plane;

and the second movable member has an internal end within the said sealed housing and an external end outside said sealed housing and the internal end is attached rigidly to a second driver which is a stepper motor which rotates the said sealed housing with respect to the said second movable member about the axis of the said stepper motor such that the external end of the first movable member and any external device attached thereto traces an arc in a plane orthogonal to the plane of rotation produced by the said first movable member.

3. The apparatus of claim 1 wherein the means for positioning is an XY motor-driven table.

4. The apparatus of claim 1 wherein the first and second movable members are attached in a sealed fashion to the said sealed hosing using bellows.

5. The apparatus of claim 4 including weights for generally balancing said manipulator.

6. The apparatus of claim 5 wherein the manipulated device is an ultrasonic transducer.

7. The apparatus of claim 6 wherein the angle of rotation in the first plane is between +45 and −45 degrees.

8. The apparatus of claim 7 wherein the angle of rotaion in the second plane is between +10 and −10 degrees.

9. The apparatus of claim 1 wherein the minimum angular movement and the precision of rotation in each of the first and second planes of rotation is less than or equal to 0.1 degree.

* * * * *